UNITED STATES PATENT OFFICE.

JESSE R. FITZGERALD, OF TORONTO, ONTARIO, CANADA.

COMPOSITION FOR WOOD-FILLING.

No. 842,190.  Specification of Letters Patent.  Patented Jan. 29, 1907.

Application filed July 9, 1906. Serial No. 325,402.

*To all whom it may concern:*

Be it known that I, JESSE ROLAND FITZGERALD, of the city of Toronto, in the county of York and Province of Ontario, Canada, have invented a certain new and useful Composition for Wood Filling and Surfacing Purposes; and I hereby declare that the following is a full, clear, and exact description of the same.

This invention relates to a composition for filling surface grains; and it consists of eleven and four-sixths parts of powdered silica and ten and five-sixths parts of alumina combined with thirty-five parts of benzin, and two and three-sixths parts of turpentine, the benzin being employed to hold suspended the powdered silica and alumina and the turpentine to counteract the effect of the benzin upon the other ingredients hereinafter stated. The benzin, turpentine, powdered silica, and powdered alumina are intimately mixed together until they attain the consistency of a thick fluid. Fifteen parts of brown japan and twenty-five parts of gum-varnish are then added to the mixture, the varnish being employed to cause the adhesion of the composition to the applied surface and the japan being employed as a drier to cause the composition to harden when applied to the surface. If the composition is free from the presence of turpentine, the benzin will convert the varnish into a lumpy condition; but with the turpentine present in the composition the reaction of benzin and varnish will be counteracted. The japan and the varnish when added to the benzin, turpentine, silica, and alumina are intimately mixed therewith until all of the ingredients are properly combined. The composition can then be applied by means of a brush or by dipping the surface to be filled into it.

When the composition has dried upon the applied surface, it can be sandpapered until a smooth surface is obtained.

The composition when applied to the surface, owing to its liquid condition, enters and fills the grains or pores, the silica and the alumina forming a hard and refractory body and the varnish fixing them within the grain by its adhesive properties.

Having thus fully described my invention, what I claim as new, and desire to secure by Letters Patent, is—

1. A composition for wood filling and surfacing purposes consisting of a mixture of benzin, turpentine, silica, alumina, brown japan, and varnish.

2. A composition for wood filling and surfacing purposes consisting of a mixture of thirty-five parts benzin, two and three-sixths parts turpentine, eleven and four-sixths parts powdered silica, ten and five-sixths parts alumina, fifteen parts brown japan and twenty-five parts varnish.

Toronto, July 5, A. D. 1906.

JESSE R. FITZGERALD.

In presence of—
 CHAS. H. RICHES,
 H. L. TRIMBLE.